United States Patent [19]

Kroon et al.

[11] 4,449,198

[45] May 15, 1984

[54] DEVICE FOR INTERACTIVE VIDEO PLAYBACK

[75] Inventors: Dirk J. Kroon; Klaas H. J. Robers, both of Eindhoven, Netherlands

[73] Assignee: U.S. Philips Corporation, New York, N.Y.

[21] Appl. No.: 114,489

[22] Filed: Jan. 23, 1980

[30] Foreign Application Priority Data

Nov. 21, 1979 [NL] Netherlands .................. 7908476

[51] Int. Cl.³ .................. H04N 5/76; G06F 13/06
[52] U.S. Cl. .................. 364/900; 358/342; 360/72.2; 369/33
[58] Field of Search ... 364/900 MS File, 200 MS File; 358/102, 127, 128.5, 128.6; 360/72.1, 72.2, 79, 78, 86, 33, 10; 434/308, 309, 318, 433; 369/18, 32, 33, 47, 41

[56] References Cited

U.S. PATENT DOCUMENTS

| | | | |
|---|---|---|---|
| 3,742,289 | 6/1973 | Koeijmans | 364/900 |
| 3,982,065 | 9/1976 | Barnaby et al. | 358/147 |
| 3,987,484 | 10/1976 | Bosche et al. | 360/72.2 |
| 4,000,510 | 12/1976 | Cheney et al. | 360/72.2 |
| 4,028,733 | 6/1977 | Ulicki | 360/72.2 |
| 4,041,463 | 8/1977 | Slutzky et al. | 364/900 |
| 4,052,798 | 10/1977 | Tomita et al. | 434/307 |
| 4,195,317 | 3/1980 | Stratton | 360/72.1 |
| 4,290,081 | 9/1981 | Foerster | 360/72.2 |

OTHER PUBLICATIONS

Bennion et al., "Interactive VideoDisc Systems For Education," *Journal of the SMPTE*, vol. 84, No. 12, Dec. 1975, pp. 949-953.
Mathieu, "A Random Access System Adapted for the Optical VideoDisc: Its Impact on Information Retrieval," *SMPTE Journal*, vol. 86, No. 2, Feb. 1977, pp. 80-83.
*Apple II Reference Manual*, Jan. 1978, 151 pp., Apple Computer Inc.
*Apple In Depth*, Fall 1981/Winter 1982, 96 pp., Apple Computer.

*Primary Examiner*—Leo H. Boudreau
*Attorney, Agent, or Firm*—Thomas A. Briody; Jack E. Haken; James J. Cannon, Jr.

[57] ABSTRACT

A device for interactive video playback utilizing a modified playback apparatus for video discs. Such a video disc contains stored video information and possibly also audio information. The various playback and addressing modes can be activated by operation of buttons. The information read is directly suitable for playback on a television screen. The playback apparatus is modified for executing these playback and addressing modes also under the control of selection signals received from a computer. There is also provided an extraction element for extracting the frame numbers from the information read and for supplying these numbers as data to the computer. The computer furthermore includes a read/write memory for the storage of the information of alphanumerical characters and of selection signals for the playback apparatus. In some cases, the latter signals are activatable only by a request signal. The computer also includes an output for said alphanumerical characters as additional display information. There is also provided a keyboard suitable on the one hand for inputting instructions for the computer which are expressed in a higher programming language in order to modify the program to be executed by the computer. It can also be used for producing a request signal for activating a selection signal read from the read/write memory.

7 Claims, 8 Drawing Figures

```
500 REM ** RANDOM ACCESS ROUTINE **
510 GOSUB 700: REM  GET ACTUAL FRAME NUMBER
520 IF ACTUAL>(FRAME+100) THEN GOTO 550
525 IF ACTUAL<(FRAME-200) THEN GOTO 590
530 IF ACTUAL>FRAME THEN GOTO 560
535 IF ACTUAL<FRAME THEN GOTO 580
540 IF ACTUAL=FRAME THEN GOTO 570
550 POKE -16192,3: GOTO 510: REM  SEARCH REVERSE
560 POKE -16192,5: GOTO 510: REM  PLAY REVERSE
570 POKE -16192,9: RETURN : REM   FOUND!! STOP
580 POKE -16192,12: GOTO 510: REM  FAST FORWARD
590 POKE -16192,13: GOTO 510: REM  SEARCH FORWARD
600 REM ** PLAY UNTIL ROUTINE **
610 POKE -16192,11: REM  SET VLP TO PLAY
620 GOSUB 700: REM  GET ACTUAL FRAME NUMBER
630 IF FRAME>ACTUAL THEN GOTO 620: REM  NOT YET
640 CALL -936: REM  CLEAR SCREEN
650 RETURN : REM  FOUND!!
700 REM ** GET ACTUAL FRAME NUMBER **
710 A1= PEEK (-16192): REM  GET 2 BCD NUMBERS
720 A2= PEEK (-16191): REM  GET 2 BCD NUMBERS
730 A3= PEEK (-16190): REM  GET 1 BCD NUMBER
740 B1=(A1/16)*10+A1 MOD 16: REM  BCD TO BINARY
750 B2=(A2/16)*10+A2 MOD 16: REM  BCD TO BINARY
760 B3=A3 MOD 8: REM  BCD TO BINARY
770 ACTUAL=B1+100*B2+10000*B3
780 RETURN
```

```
5 REM  ** INTERFACE IN SLOT #4 **
10 REM  ****** NEW CHAPTER ******
20 FRAME=4700
30 T$="INTERACTIVE COURSE IN SPANISH - PART 2"
40 GOSUB 500: PRINT T$: REM  RANDOM ACCESS TO 4700, PRINT TITLE
50 FRAME=4950:T$="FANDANGO - SPANISH DANCE"
60 GOSUB 600: PRINT T$: REM  PLAY TO FRAME AND THEN PRINT T$
70 FRAME=5200
80 GOSUB 600: POKE -16192,9: REM  STOP
90 A$="FANDANGO MUSIC IS PLAYED ON GUITAR,TAMBOURINE AND CASTANETS"
100 GOSUB 250: REM  DO YOU UNDERSTAND WHAT WAS SAID?
110 FRAME=5310:T$=". . .IN A 3/8 TIME"
120 GOSUB 600: PRINT T$: REM  PRINT THE NEXT COMMENT
130 REM  AND SO ON WITH THE PROGRAM
200 END
250 REM  *** TEST ***
260 CALL -936: REM  CLEAR SCREEN
270 PRINT "TRY TO TRANSLATE"
280 PRINT "TYPE 'T' FOR TRANSLATION"
290 PRINT "TYPE 'G' FOR GO ON"
300 PRINT "TYPE 'R' FOR REPEAT": PRINT : PRINT
310 IF PEEK (-16384)<128 THEN GOTO 310
320 X= PEEK (-16384): POKE -16368,0: REM  READ, RESET KEYBOARD
330 IF X= ASC("G") THEN RETURN
340 IF X= ASC("T") THEN PRINT A$
350 IF X= ASC("R") THEN GOTO 370
360 GOTO 310
370 MEMFRAME=FRAME:FRAME=FRAME-256
380 GOSUB 500
390 FRAME=MEMFRAME
400 GOSUB 600: POKE -16192,9: REM  VLP STOP
410 GOTO 270
```

FIG. 7A

DEVICE FOR INTERACTIVE VIDEO PLAYBACK

BACKGROUND OF THE INVENTION

The invention relates to a device for interactive video playback, utilizing a playback apparatus for a selectively addressable and optically readable video disc, said playback apparatus comprising manually activatable control means for the selective activation of one of a number of playback and addressing modes, and also comprising a first output for the video information read from a disc and organized in frames. A playback apparatus of this kind is marketed by Magnavox Corporation, Fort Wayne, Ind., U.S., type number VP 600. A number of technical properties is described in the article "Educational/Institutional features of the Optical Videodisc System", by P. T. Cavanagh, SMPTE Journal, Vol. 86 (April 1977), pp. 201–203, and in the article "A Random Access System Adapted for the Optical Videodisc" by M. Mathieu, SMPTE Journal, Vol. 86 (April 1977), pp. 80–83. Examples of playback modes are "normal forward" and "fast forward". Examples of addressing modes are "search forward" and "stop". The video discs contain only readable, fixed information and for each new program, for example, an educational program, it would be necessary to produce a new video disc, which, obviously, is expensive. A further important drawback of the known device consists in that it does not have facilities for the automatic addressing of a given frame and for automatically activating, in connection with the addressed frame, a given playback or addressing mode, because externally (outside the playback channel) no information is available concerning an identification-information-per-frame.

SUMMARY OF THE INVENTION

It is an object of the invention to make said device better suitable for an interactive system, first of all by making the frame numbers externally available and furthermore by making readily activatable control information on the basis of which a playback mode and, if desired, a given frame within a playback mode, can be automatically selected and, in conjunction therewith, to increase the possibilities of playing back information which has been added to the control program at a later stage and which represents, for example, a choice to be made by the operator. The object in accordance with the invention is realized in that the device furthermore comprises a. a first input in said playback apparatus for receiving selection signals for the selective activation, in the same way as by said control means, of one of said number of playback and addressing modes;

b. an extraction element for receiving said video information and for detecting and extracting frame numbers therefrom for presentation to a second output;

c. a computer comprising:

c1. a second input which is connected to said second output in order to receive said frame numbers;

c2. a third input for connection of a read/write memory for the storage of the data of alphanumerical characters and of selection signals for said playback apparatus which can only be conditionally activated by a fulfilling signal;

c3. a third output which is connected to said first input in order to output an activated selection signal;

c4. a fourth output for supplying control signals and data signals to said read/write memory;

c5. a fifth output for supplying, under the control of a predetermined frame number which acts as data for said computer, the data of a predetermined number of said alphanumerical characters as additional video information in order to illustrate a playback or addressing mode, notably of a waiting situation while awaiting a fulfilling signal to be received;

c6. a keyboard for inputting a fulfilling signal in order to activate, during a waiting situation, a change over to a next playback or addressing mode or waiting situation.

The video disc thus contains a series of frames, possibly with associated sound, while the read/write memory remains available for additional text, to be conditionally played back or not, and for control signals, for example, to allow the operator to activate a branching or selection. The use of an optically readable video disc offers a further advantage in that the reading does not involve wear, so that, if desired, one or a few frames can be played back for a prolonged period of time. The read/write memory may be incorporated in the internal memory of the computer. In principle, a single video disc of this kind can be used for a number of very diverse program realizations.

Preferably, said keyboard is suitable to receive computer instructions which are organized according to a higher programming language. Said control signals or the text to be displayed can thus be readily modified so that, for example, the editing of an educational program stored on a video disc is still readily possible at a later stage. The use of a higher programming language, such as "BASIC", enables very simple and fast introduction of such modifications.

FURTHER DETAILS OF THE INVENTION

Preferably, between said playback apparatus and the computer there is provided an interface which comprises, in addition to said extraction element, emulation switches for a number of said manually activatable control means in order to electrically emulate the activated condition of the associated control means. Thus, only minimum changes are required on the playback apparatus to enable the operating mode required at a given instant to be activated by hand as well as by the computer.

Preferably, said fifth output is suitable for the connection, independent of said first output, of an additional apparatus for the display of information organized in frames. The addition of such an additional display apparatus, for example, a black/white television monitor, introduces a separation between the picture originating from the video disc and that presented by the read/write memory. Ergonomically, this is an attractive solution: because the pictures are spatially separated, the operator, for example, a student to be instructed, can make a choice from the material presented at the same instant by directing his attention to the relevant picture. On the other hand, the additional display apparatus may also have a limited capacity, which may consist of, for example, one line of display elements, each for one alphanumerical character. On the other hand, the information (text) originating from the read/write memory can also be used in a cheaper system as an "insert" in the picture formed by the reading of the video disc. However, part of the latter picture is then covered by the insert.

Preferably, said third input is suitable, by way of a parallel connected sixth output for an address signal, for the connection of a second read/write memory which acts as a background memory and which has a storage capacity for audio information, a seventh output of said second read/write memory being provided for the connection of an acoustic generator for the reproduction of acoustic information which is received separately from said playback apparatus. The audio information to be reproduced can thus be supplemented again at a later stage, enabling further personalization of the program in given cases. For example, in a language teaching program, the latter information may concern the pronunciation, given "difficult" words being pronounced in an exaggerated manner; the video disc in that case contains the "natural" pronunciation.

BRIEF DESCRIPTION OF THE FIGURES

The invention will be described in detail hereinafter with reference to the accompanying diagrammatic drawing.

DETAILED DESCRIPTION OF A PREFERRED EMBODIMENT

Figure 1:
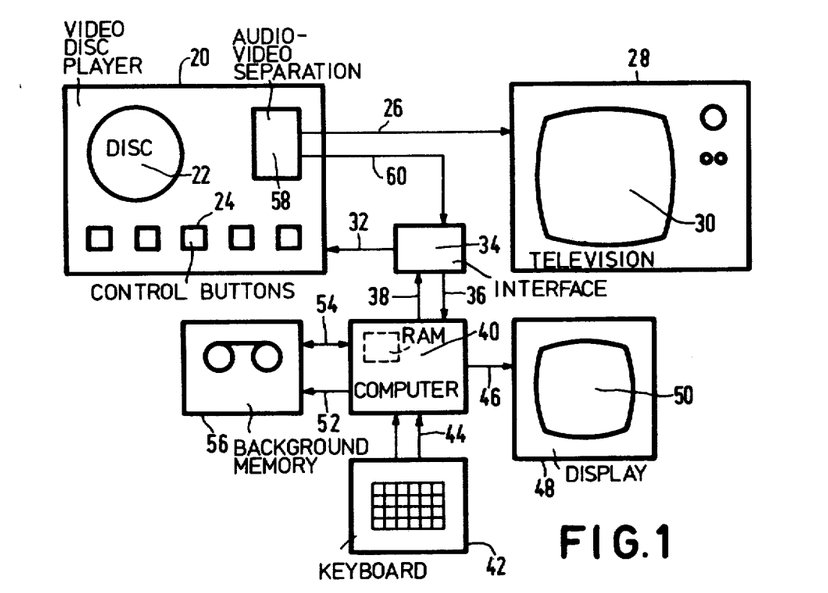
FIG. 1 shows a block diagram of an educational system incorporating the invention.

FIG. 1 shows an educational system incorporating the invention. The following modules are present. Block 20 is a playback apparatus for a selectively addressable and optically readable video disc, for example, a playback apparatus of the type VP 600, made by The Magnavox Corp., Fort Wayne, Ind. The circle 22 diagrammatically denotes such a video disc which, however, is removable. The data is organized in concentric tracks, each of which can contain the data of one television frame, and also the amount of sound associated with this television frame, the arrangement being in accordance with the conventions for transmitting a television picture, for example, the NTSC system. The disc is continuously driven at a speed of thirty revolutions per second and the amounts of video and audio originating from a single track each time fill an interval of 1/30 seconds. The data is contained in small recesses in a light-reflective disc surface; this surface is scanned by a helium-neon laser beam unit which is not shown for the sake of brevity and which comprises means for maintaining the centering to a given track. The storage of the video data on the disc is realized by means of analog techniques by way of the shape of said recesses. The track parts on the disc which corresponds to the line flyback periods (horizontal) and the frame flyback periods (vertical) include space for additional information such as synchronization information for the television receiver to be connected, and for additional information such as frame numbers (these numbers are provided for each frame) or, for example, text in the way of a teletext system, or stop information for stopping the playback at the end of a passage. The disc is manufactured using techniques known for the grammophone record industry, so the disc actually acts as a read only memory. The reference numeral 24 indicates a number of buttons for the selective activation of a number of playback and addressing modes. In this respect, reference is made to FIG. 3 which shows a first part of an interface between the playback apparatus for the video disc and the computer, in combination with a relevant part of the playback apparatus. The latter comprises a number of control buttons 100 to 122. When the button 118 is operated, the apparatus assumes the "play forward" mode: the frames stored are read one after the other at the speed at which a television receiver reproduces successive frames. The rotary speed of the video disc exactly corresponds to frequency. If this button 118 is operated again, the playback stops and each time the same frame is read. If the button 110 is operated, the frames stored are read in the reverse order. This is the mode "play backward". If the button 114 is operated, the frames stored are read in the normal order but at a reduced speed. If the button 116 is operated, the frames stored are read in the reverse order and at a reduced speed. In practice, the reduced speed is realized by reading each frame a fixed number of times. This number of times can be varied from 1 to a given higher value under the control of the position of the potentiometer 124. If the button 106 is operated, the frames stored are read at an increased speed in that one frame is skipped. Subsequently, one frame is read again. This produces the effect of showing a film at twice the normal speed. If the button 112 is operated, the playback halts and the same frame (track) is read. If this button 112 is operated again, the apparatus proceeds to the next track and the next frame is read. The video disc can thus be scanned at an arbitrary low speed. The button 108 operates like the button 112, but in this case the apparatus returns to the preceeding track for continuously scanning the associated frame. The buttons 106 to 118 are connected by a mechanism for mutual exclusion. If a button is operated, the operation of the last button depressed is invalidated. The latter mechanism, and also the previously described "hold" mechanism, have been omitted for the sake of brevity.

Figure 3:
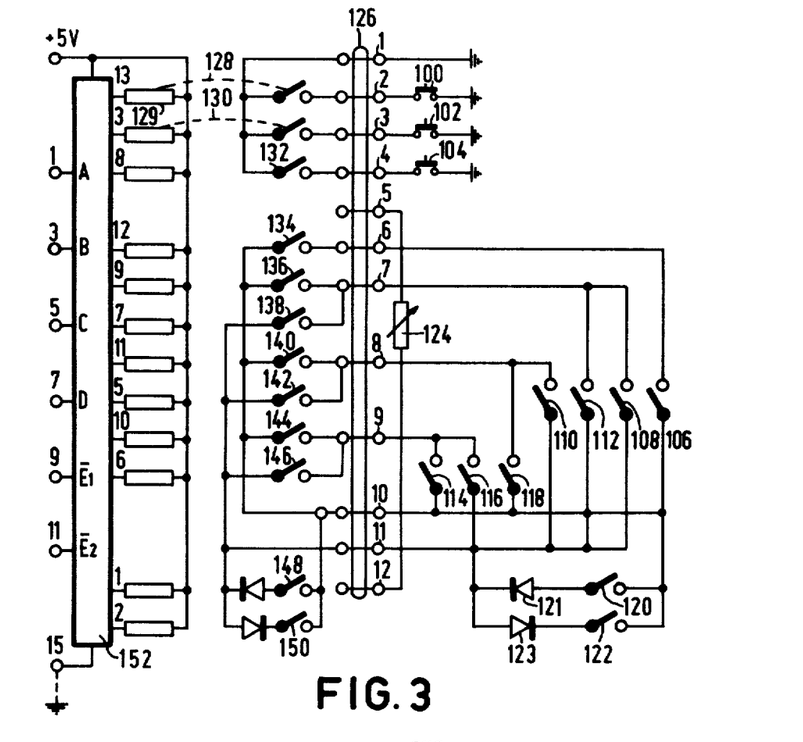
FIG. 3 shows a first part of an interface between a playback apparatus for a video disc and a computer.

If the button 104 is operated, together with the video information the information of the track number is presented to the same output of the playback apparatus for display in an insert of the television picture. If this button is operated again, this frame number information is no longer presented. If button 100 is operated, the selection device for the tracks of the video disc is driven at a comparatively high speed. As a result, a next frame is played back in rapid succession (a few times per second), successively played back frames being situated at a large number of tracks from each other on the video disc. This mode does not have the effect of showing a picture film at an increased speed, but acts as a search forward mode for reaching a desired frame. The video information becoming available still gives the user an impression as regards the location in the sequence of frames stored on the disc. If button 100 is released, the mode prevailing thus far (buttons 106–118) is restored. Button 102 operates in the same way as the button 100, but in the reverse drive direction of the reading mechanism.

When the button 120 is operated, for each track read the audio information contained therein is extracted and the first half thereof is presented in a suitable manner on an output for a television receiver for audio playback. If the button 120 is operated again, this presentation is terminated. If button 122 is operated, the same occurs as when the button 120 is operated, be it for the second half of the audio information stored per track. The relevant audio information may be of a different kind, for example, left/right in the case of stereo playback or, for example, a text in two languages in the case of a film. The buttons 120, 122 are not included in the described mechanism for mutual exclusion. The diodes connected in series therewith only conduct signals of one polarity in order to enable separate control of the two audio channels.

The described buttons 100 to 122 are implemented in the described playback apparatus and are, obviously, connected to further components of the circuit therein for suitable activation of these components. These connections have been omitted in this description for the sake of brevity. Furthermore, the on/off control of the playback apparatus has also been omitted for the sake of brevity.

Referring to FIG. 1 again, the playback apparatus comprises such a separation element 58 which receives the data read from the disc and which separates therefrom the data required for the reproduction of video and audio, respectively. This information appears on line 26. The television receiver 28 is to be connected thereto via its aerial input. The picture is displayed on the picture tube 30, any sound received being reproduced via the loudspeaker(s) of the television receiver.

Furthermore, in the separation element 58 the frame number is separated from the information and, if necessary, is added to the video information as an insert to enable selective display under the control of the button 104. The frame number information is, moreover, supplied on line 60 for further processing. The operation of this mechanism will be described in detail at a later stage. The module 58 is referred to as module MR 39 in the described playback apparatus and is arranged on the top plate, by means of a multi-pin connector, as a separate printed wiring board with soldered-on components. The line 60 is connected to some of the pins of this connector, i.e. to the pins 1, 5 and 7.

The frame number supplied is conducted on line 36 via the interface 34. Block 40 is a computer of a simple, readily programmable type, for example, a so-called personal computer. A suitable apparatus in this respect is the APPLE II, made by Apple Computer Inc., 10260 Bandley Dr., Cupertino CA, 95014, and described in the Apple II Reference Manual, 1978 (January) issued by the manufacturer. Via the line 36, the computer receives a frame number for each frame to be displayed (line 26). Via lines 44, the computer is also connected to the keyboard 42 (actually, this keyboard is accommodated in the housing of the computer). The computer inter alia comprises a processor with an arithmetic and logic unit (ALU) for executing a set of operations, an interpreter program which, using a given amount of memory (in this case a ROM memory), is capable of converting the control signals received from the keyboard in a higher programming language (BASIC) into computer code signals, an internal memory for the storage of control and data signals, a connection for a background memory, a connection for a video monitor, and a connection for a further peripheral apparatus. Instead of using control signals in the form of "BASIC" instructions, data can also be input in the so-called "assembler" language. In given circumstances, the latter is to be preferred because the described interpreter program then need not reside in the computer. The computer furthermore comprises a read-only memory for micro-instructions for control, and an amount of read/write (RAM) memory for modifiable data and programs.

The background memory 56 in a simple embodiment is suitable for the storage of programs formed in the RAM memory (not elaborated). On the other hand, these programs can also be loaded into the RAM memory. In this case the background memory 56 is a tape recorder N 2215, made by N.V. Philips' Gloeilampenfabrieken, Eindhoven, The Netherlands. The connection of such a simple tape recorder is described in the "APPLE Reference Manual", notably on the pages 4 to 8, 108 and 109. Line 54 thus operates as a bidirectional data link, while the control information (reading, writing, fast winding, stop) has to be input in the apparatus by the known manual control.

In a further embodiment, a flexible memory disc or so-called floppy disc can be used for the background memory.

In an arrangement offering even greater possibilities, use can be made of a tape recorder with an external addressing facility, for example, a tape recorder of the type Philips N 2554. This recorder incorporates search modes so that tape intervals between a selectively addressable starting point and a selectively adjustable end can be played back. A stop is made at the end. Such a tape recorder is then connected by way of an address/control line 52 from the computer 40. Such a tape interval to be played back contains, for example, an interval with audio information which becomes available for the computer 40 or not, or which is directly despatched to an acoustic generator. The latter has been omitted for the sake of brevity: it may be a simple acoustic generator (compare element 76 in FIG. 2) e.g. a loudspeaker in a simple embodiment. In a more complex embodiment, vocoder means may also be used.

Element 48 is a standard black/white television monitor which receives, via line 46, the data of the characters to be displayed from the computer. In a programming mode of the system, there is provided a cursor device for supplying new information to the screen. Further control information may be: start in a new line, shift the image information over one line (scroll mode) and so on. The line 46 is a normal video signal line which, therefore, is not fed via an aerial input. The information to be displayed on the monitor 48 thus consists at least mainly of characters which have either been generated in the computer (for example, by means of the keyboard), or which have been read from the read/write memory for the program which is not separately shown. In relevant cases the program may also contain graphic symbols, for example, coded in accordance with the standards of the teletext system and the like.

Via line 38, control signals for the playback apparatus can be transported from the computer 40, and on the line 36 the frame number information of a played back video disc is received.

Figure 2:
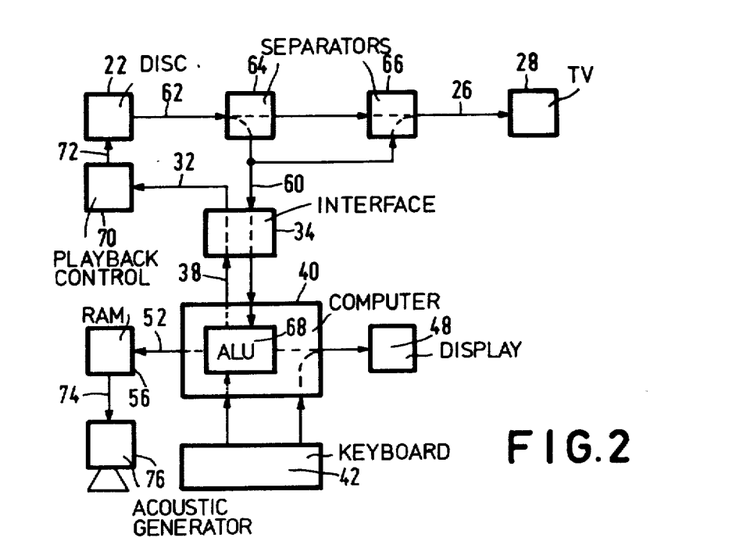
FIG. 2 shows the paths of data and control signals therein.

FIG. 2 illustrates the path of a number of information and control signals in FIG. 1. The disc 22 (wherever useful, the same references as used in FIG. 1 are used) produces the signals read on the line 62. In block 64, the frame numbers are extracted and in block 66 they are added as a facultative insert to the video signal. The line 26 transports the video signal to the television receiver 28. The elements 64, 66 together form the separation element (58). Via the line 60, the frame numbers are also applied to the interface 34. They subsequently proceed to the data processing section 68 of the computer 40 in which they act as data for comparison with predetermined frame numbers which have been read from the computer memory. The keyboard 42 can supply further data and addresses to the data processing section. Control signals are produced on the line 38. Block 34 also contains the emulation switches yet to be described (FIG. 3) which are capable of activating, via the multiple line 32, the control section 70 of the playback apparatus (20 in FIG. 1). The step signals for the scanning laser device then appear on line 72. The data processing section 68 and the keyboard 42 are capable of supplying character information to the monitor 48 (the keyboard notably in the programming mode). The random access background memory 56 can receive address signals on line 52 and supplies signals on line 74 for the acoustic generator 76. The use of a background memory for the program storage is not elaborated herein.

FIG. 3, which has already been partly described, shows a first section of an interface 34 between the playback apparatus for the video disc and the computer. The buttons/switches 100 to 122 are accommodated in the playback apparatus, like the potentiometer 124. The playback apparatus is connected to the interface via a twelve-pole flat cable 126. The poles of the flat cable 126 are numbered from 1 to 12. In the interface, 128 denotes a so-termed reed relay of the make Clare, type PRME 15005 B. This relay comprises a drive coil which is bridged by a diode. In the switch 128, these elements are shown together as an elongate block. Only the actual switch of most other switches of this series of relays is provided with an indication (132 to 150). The twelve switches 128 to 150 each time from the opposite member (emulation switch) of one of the switches/buttons 100 to 122. Each of these switches 128 to 150 bridges one of the switches 100 to 122. The switches 128 to 150 are activated by signals from the module 152; this TTL module is a decoder of the type SN 74154 for converting a binary code into a 1-out-of 16 code. The connections are numbered in accordance with the manufacturer's manual concerning the internal connections of the integrated circuit; therefore, this does not concern the external numbering of the pins of the IC module (DIP) which is not shown. The power supply connections are 0 volts (ground) and +5 volts. The four-bit input code can be received on the terminals A to D. On the terminals $\bar{E}_1$ and $\bar{E}_2$, two enable signals can be received. Each of the terminals 1, 2, 3, 5, 6, 7, 8, 9, 10, 11, 12, 13 is capable of activating one of the said reed relays (the reed relays are powered by a source of +5 volts).

Figure 4:
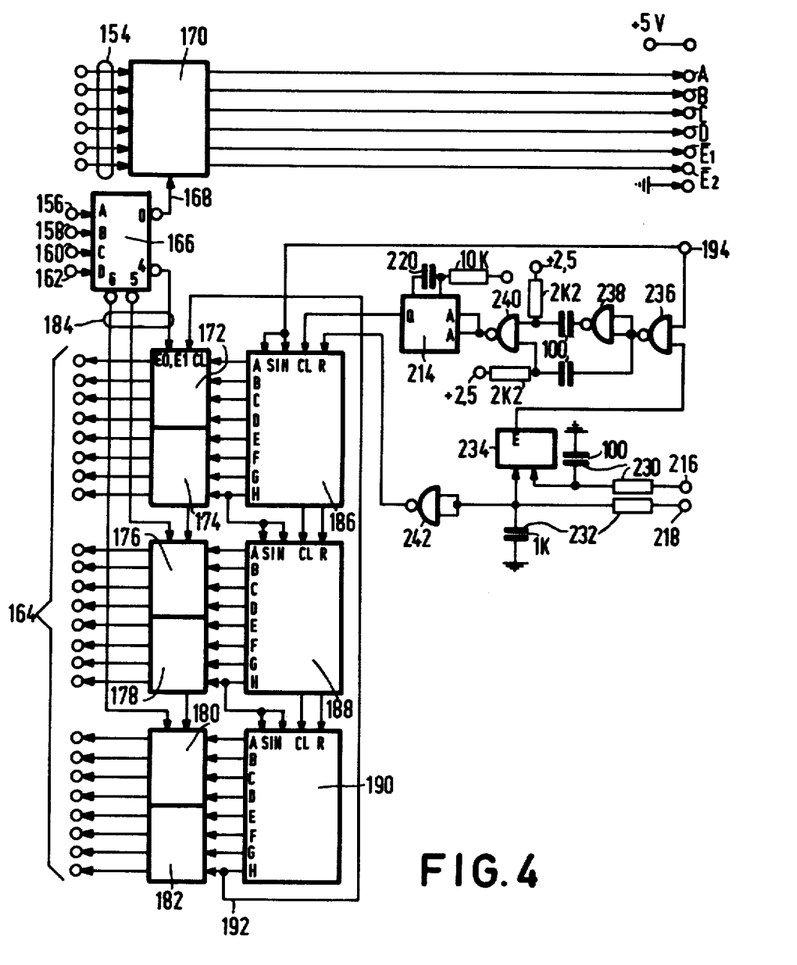
FIG. 4 shows a second part of such an interface.

FIG. 4 shows a second part of said interface 34. At the top right of the Figure there is shown the output to the circuit of FIG. 3 (four data signals, two enable signals and two power supply connections). At the left side of the Figure the connection to the computer is shown.

Line 154 is connected to a data output of the computer which has a width of six bits. The terminals 156, 158 receive the two most-significant output address bits, AD0, AD1, respectively, of the computer. Terminal 160 receives a read/write (R/W) output signal of the computer. Terminal 162 receives a selection signal for a peripheral apparatus (device select) of the computer. The latter two signals form part of the control bus of the computer. The 6×4 bit line 164 is capable of supplying six BCD coded characters to the computer. The specific connection instructions can be found on page 149 of said APPLE II computer manual.

Block 166 represents a module of the type SN 54L 42, which is a decoder for converting a binary code into a 1- out-of-10 code. The connection terminals are indicated in accordance with the manual issued by the manufacturer. The signal on the line 168 acts as a clock signal for the block 170. Block 170 is a module of the type SN 74174; this is a six-fold data flipflop which acts as a buffer for the control signals to be supplied to the playback apparatus: under the control of a clock signal on the line 168, any modified word is taken over from the line 154. The blocks 172 to 182 represent six modules of the type HEF 4076, make Philips. These are quadruple D-flipflops having a so-called tristate output. An output of this kind has the following logic states: logic "0", logic "1" and "terminated by a high impedance". In the latter case, the potential of the connected line will generally be determined by any other signal and/or supply sources connected thereto. These 24 flipflops form an output buffer for the data of the frame number such as it is received from the playback apparatus. The lines 184 are connected to the outputs 4, 5, 6 of the element 166. A first signal value of the relevant signals supplies the information of the flipflop elements 172 to 182 to the line 164. A second value of the signals on the lines 184 drives the outputs of the flipflop elements to the high-impedance state. In reaction to a logic "1" on the line 192 (acting as a clock signal), the flipflop elements 172 to 182 store the 24 bits on their common inputs. The connection of the line 192 is only explicitly shown for the block 172; for the other blocks it is only symbolically shown.

The blocks 186, 188, 190 represent three modules of the type SN 74 164; these modules are 8-bit shift registers with serial input and parallel output. The information is supplied in parallel to the double terminal SIN (serial in). Shifting is realized under the control of clock signals on the input CL (clock). A signal on the input R (reset input) resets the content of the modules 186, 188, 190 to zero. For the sake of simplicity, the latter connections are explicitly shown only for the module 186; they are only symbolically shown for the modules 188, 190.

Figure 5:
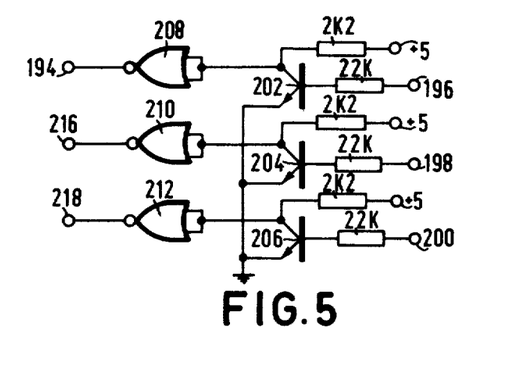
FIG. 5 shows a third part of such an interface.
Figure 6:
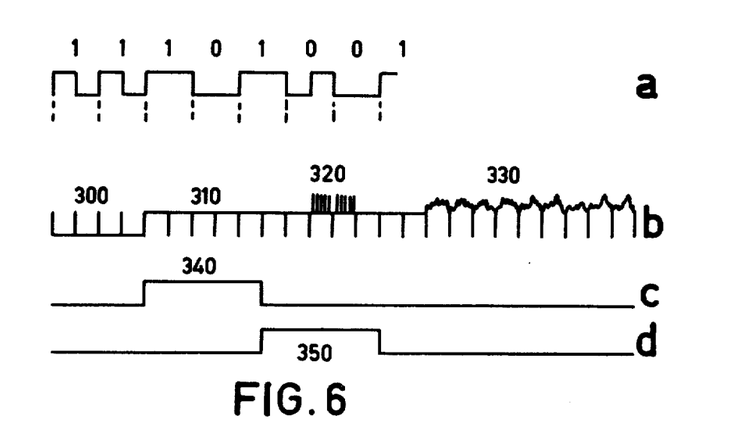
FIG. 6 shows a time diagram concerning the extraction of a frame number.

The data is received on the terminal 194, that is to say the serial data derived from the circuit of FIG. 5; in this respect, reference is made to some time-dependent waveforms which are shown in FIG. 6. A curve (b) in FIG. 6 diagrammatically gives an impression (not to scale) of the organization of the video signal. At the indication "300", the low signal provides an indication of the vertical flyback pulse with which each new frame commences. At the indication "310", the high signal provides an indication of the non-video part which fills the upper lines of the television picture (this part is thus displayed as being "dark"). The vertical strokes in the zones 300, 310 and 330 provide an indication of the horizontal flyback pulses with which a next television line commences and which continuously occur, also outside the period during which the actual picture section is traversed. In the part denoted by the reference numeral "330", the actual picture is situated, the signal of each television line being shown as a wave. At "320", between two successive pairs of horizontal flyback pulses the information of the frame number is present, so that a number of pulse-shaped signals is symbolized. The frame number is coded according to a biphase code, the essence of which is shown in FIG. 6 at (a).

Each bit cell commences with a transition. A "one" is defined as a transition from low to high, a "zero" being defined as a transition from high to low. The length of a bit cell is 2 microseconds. The signal level immediately after the start of the bit cell thus determines the data content. If two identical data directly succeed each other, there is a further signal transition at the center of the bit cell, but otherwise this transition is absent. The video signal is converted by a clipper into the so-termed "clipped video" signal, which in that case has a binary signal value "0" or "1", the visual information being mutilated but notably the frame number data being maintained. The frame number is coded in a sequence of six characters of four bits. The first character per definition has the value "1111", while the subsequent five characters as BCD characters represent a five-digit decimal number. The circuit of FIG. 5 forms an electrical adaptation. The three inputs are derived in the playback apparatus from the described module MR 39. This module comprises a single row of connections, only the pins 1, 5 and 7 thereof being used. These pins are connected to the circuit of FIG. 5. On the terminal 196 (being the previously described pin "5"), the signal appears which is known as the "clipped video" signal; this is a direct representation of the video signal to be applied to a television receiver, for which a binarization to an 1/0 signal has taken place. This signal is applied, via the matching transistor 202 and the NOR-gate 208 which is used as a reversing circuit, to the terminal 194 (also in FIG. 4) where it acts as data. On terminal 198 (being the previously mentioned pin "7"), the so-called "frame blanking" signal appears which is diagrammatically shown in FIG. 6 at "c": it consists of a long signal pulse during several frame lines which do not lead to information to be displayed. It is adapted and converted in the same way by means of the transistor 204 and the NAND gate 210 in order to be applied to terminal 216 of the circuit of FIG. 4.

Terminal 200 (being the previously mentioned pin "1") receives the composite synchronization signal or composite sync signal. It is adapted and inverted in the same way by means of the transistor 206 and the NOR-gate 212 in order to be applied to terminal 218 in the circuit of FIG. 4. In FIG. 4, the terminals 216 and 218 are connected to integrating networks 230, 232 which consists of a resistor of 560 ohms and a capacitor of 0.1 and 1 kpF, respectively. Needle-shaped interference pulses are thus suppressed. Element 234 is a module of the type SN 74 164. The terminal 216 is coupled to the data input thereof (see FIG. 6 at "c"). The terminal 218 is coupled to the clock input thereof. The E-output of this 8-bit shift register is applied to the AND-gate 236: as a result, five clock pulses are required to make a data signal received appear on this output. Using this organization, it is achieved that the signal of FIG. 6 at "c" is delayed by five frame line periods, as diagrammatically denoted at "d" in FIG. 6. The strteched pulse at the indication 356, therefore, coincides with the frame number data indicated at 320. Thus, the NAND-gate 236 conducts only during a small part of the period of time each time corresponding to a television picture.

The signal from the gate 236 is inverted in the NAND-gate 238. The inverted output signal and the non-inverted output signal of the gate 238 are both applied to a differentiating network which comprises a capacitor of 100 pF and a resistor of 2200 ohms. The outputs of the differentiating networks are applied to the NAND-gate 240: the output of this gate supplies a signal pulse when a transition occurs on input 194, notably one of the transitions as indicated at "a" in FIG. 6. These pulses are converted into a widened pulse by the element 214. This element is a module of the type 74 SN 121, that is to say a monostable multivibrator having an astable period of approximately 1.5 microsec. which is determined by a resistor of 10k ohms and a capacitor.

The operation is such that the delayed pulse (FIG. 6 at "d") enables the generating of the pulses of 1.5 microseconds of element 214. The first positive going edge of the frame number produces the first clock pulse for the element 186 for storing the first bit of the frame number. As has already been described, this bit is always a "1". The length of the pulse of the element 214 blocks the storage of the next signal edge. Thus, only the level of the signal directly after the odd signal edges is stored; each bit is stored exactly as one bit in the blocks 186, 188, 190.

The frame number comprises 24 bits. When the first arriving bit reaches the line 192, it controls the taking over of the frame number in the elements 172 to 182. If one or more bits are lacking for some reason, the line 192 is not activated by a "1" and the incorrect frame number is not taken over. At the beginning of each frame line period a positive pulse of the composite sync signal appears on the terminal 218. This pulse is inverted in the NAND-gate 242 which is connected as an inverter, so that at the beginning of each frame line period the shift registers 186 to 190 are reset to zero via their reset input. The double occurrence of the frame number at indication 320 in FIG. 6 acts as a redundancy, in this respect.

Figure 7A:
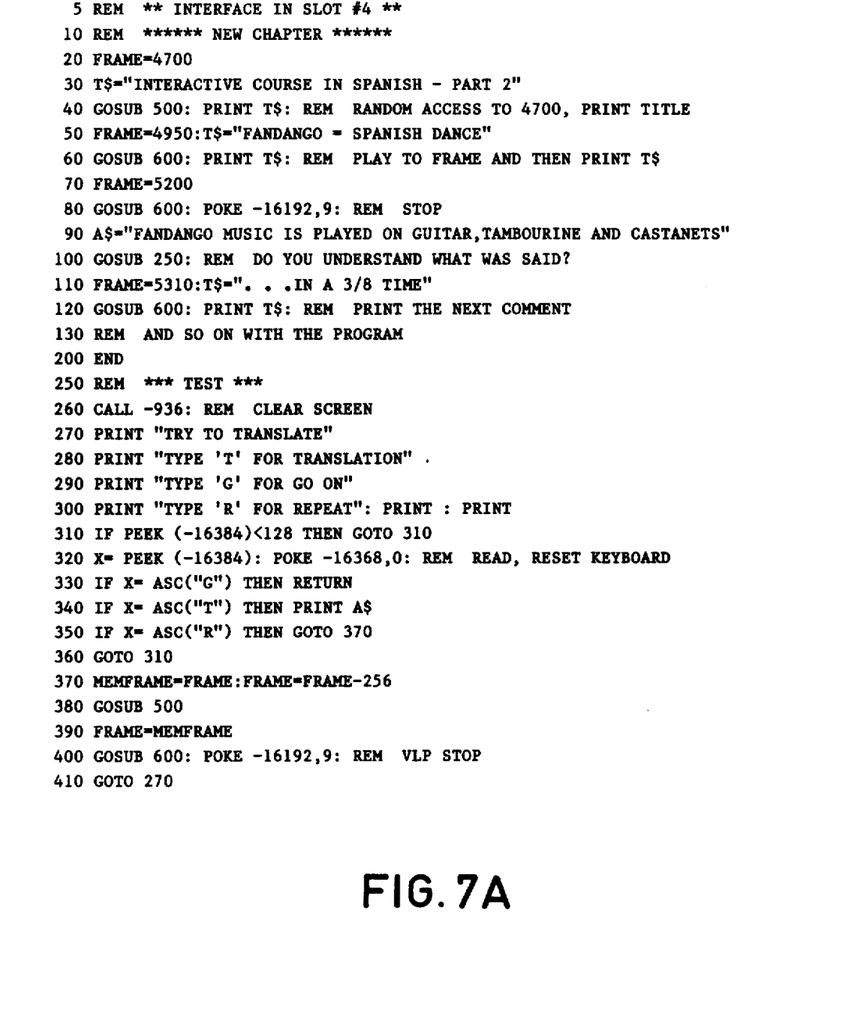
FIGS. 7a, 7b show an example of a program.
Figure 7B:
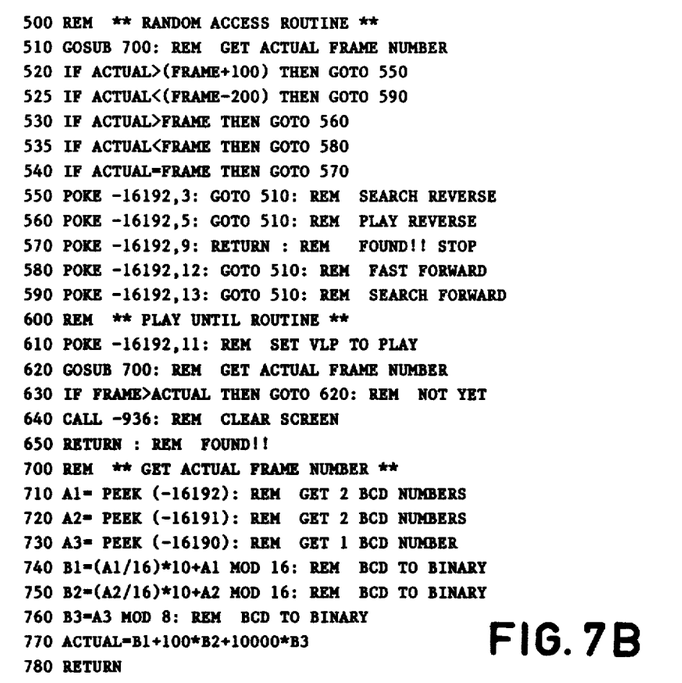

FIGS. 7a and 7b together show an example of a program such as is present in the memory of the computer for illustrating an episode of a program stored on the video disc. If the described device must be suitable for modifying the example user program by means of instructions in a higher programming language or assembler language, the memory also contains a relevant control program. This control program per se (inter alia comprising the interpreter section) forms a standard part of the described APPLE II computer and for the sake of brevity reference is made to the relevant documentation published by the manufacturer. The example program in this case contains educational material, but it is alternatively possible to program a question and answer game or to provide a motion picture recorded on the video disc with text which can be selectively displayed (for example, only during passages which are difficult to understand or which are spoken in a foreign language). The first column of the program contains the line numbers whereby the program can be addressed in the memory. The program is written in the programming language BASIC which need not be elaborated herein.

After a starting operation (not shown), the computer successively interrogates the memory addresses. Line number 5 contains a connection indication as a comment for the programmer. Line number 10 contains a further comment which indicates that the episode concerns a new chapter. Line number 20 contains a starting address/frame number for the video disc for later use. Line number 30 contains a text for display at a later stage. This text is stored in the computer memory in the form of alphanumerical characters (ASCII characters). Line number 40 refers to a subroutine on line number 500 and activates, after execution of this subroutine, a display instruction for the text then prevailing (in this case the text of the line number 30).

The subroutine of line number 500 activates an operating mode for addressing a predetermined frame (on the basis of the frame number thereof) by means of the already described "search forward" or "search backward" routine. Line number 510 first activates a second subroutine on line number 700 which fetches the actual frame number.

The subroutine of line number 700 again starts with an ident...cation comment. Line number 710 contains the instruction "PEEK", known from the APPLE computer, for reading a memory location indicated by its address (this address is given between brackets). The memory locations −16190/2 together contain five binary coded decimal digits which indicate the actual frame number as derived from the video disc information in the circuit shown in FIG. 4. Line numbers 740–770 contain a standard operation in order to retrieve the binary coded frame number therefrom. Line number 780 contains a return command to the first subroutine (i.e. to line number 520). The memory locations addressed in this context have a negative address, because the address value may not be higher than +32K due to the construction of the computer used.

The line number 520–540 contain a number of branching operations for determining the operating mode of the playback apparatus until the desired frame number has been found. The desired frame number is formed on line number 20. Assume that the actual frame number is higher than 4800. In that case, on line number 550 the memory address −16192 is filled with the value 3. (This instruction is called POKE.). The content of this memory determines the data A, B, C, D output by the switching element 170 of FIG. 4. The relevant mode is stated as a comment. Subsequently, the program directly returns to the line number 510 for executing the same operations again. If the difference between the actual and the desired frame number is large, the "search forward/backward" mode is activated. If the difference is small, the mode "fast forward" or "play backward" is activated. It is to be noted that said playback apparatus does not comprise a mode "fast backward". When the desired frame number has been found, the stop mode is activated on line number 75 and the program returns to line number 40. On line number 40 the title is displayed on the playback apparatus 48. On line number 50, a new title is fetched for later display and, moreover, a new desired frame number is stated. On line number 60, reference is made to a subroutine on line number 600.

On line number 600, the subroutine commences which controls the playback of the video disc until a predetermined frame number (in this case 4950) is reached. It is only then that the display on the T.V. receiver 28 of FIG. 1 commences. Between the numbers 4700 and 4900 (i.e. a duration of 200/30=approximately 7 seconds), the video disc contains a scene with a Spanish atmosphere. On line number 610 the playback mode is activated and on line number 620 the subroutine of the line number 700 is addressed again (this subroutine is left again and the address 630 is reached). It is then continuously checked whether the desired frame number has already been reached. If so, on line number 640 the machine subroutine on machine address −936 is addressed. This is the routine, known from the computer APPLE II, for terminating the display on the monitor 48. On the line number 650, the subroutine is left in order to return to line number 60 in the main program.

The title then prevailing is displayed and a new desired frame number is stated (line number 70). On line number 80, the playback routine is activated again and subsequently the playback of the video disc is stopped. The episode between the frames 4900 and 5200 comprise a scene with a Spanish dance with a text which is spoken in Spanish (and which, therefore, is acoustically reproduced to learn the translation). This translation (in English) is given on line number 90 (but is not yet displayed). On line number 100, a subroutine on line number 250 is addressed; this subroutine acts as a check. On line number 260, the screen of the monitor 48 is erased again. On the line numbers 270 to 300, a text to be displayed is input. On line number 310, the memory address −16384 is read. This memory location contains data which is controlled by the keyboard. When a key is depressed, this data certainly will become larger than 128, each time the last key being decisive. This interrogation routine is included in the internal operating system of the computer and need not be present in the application program described herein. The line number 310 thus performs the function of a waiting loop. When a button is depressed, on line 320 the identification of this button is read as a variable X; furthermore, at the memory location −16368 a "0" is stored, so that the keyboard is released again for new data to be keyed in.

Line numbers 330–350 act for a branching operation. If the character "R" was depressed, a repeat operation starts on line number 370: first the desired frame number (in this case (5310)) is saved. Subsequently, a newly desired frame number is calculated by subtraction of 256 (playback time of approximately 8 seconds). The frame number then desired is searched again during the subroutine on line number 500. During a return operation, the frame number saved on line number 290 is fetched again. On line number 400 the playback routine as far as this address is taken up (line number 600) and the program returns to line number 270. This repeat operation can be continued as desired.

Depression of the button T on line number 340 implies that the operator wishes to see the translation of said sentence (as information or as a check). Subsequently, the translation text (of 90) is displayed on the monitor 48, while the program returns (via line number 360) to line number 310. Thus, the spoken text (including the image) can also be repeated by way of button R, the sequence being arbitrary. It is only when the button "G" is recognized the program proceeds to line number 110: a newly desired frame number 5310 is input, and also a piece of text. If no character or a character other than the three said characters (R, G, T) is depressed, nothing happens. On line number 120 playback takes place until the frame number 5310 (time 3⅜ seconds) is reached, and a further part of the Spanish text is spoken and an associated episode is shown. The translation of this text ". . . in a ⅜ rhythm" is displayed on line number 120. On line number 130 a last comment for the programmer is given: the given program example is merely a part of a larger unit. The program terminates on line number 200.

What is claimed is:

1. A system for interactive video playback, said system including a modified video playback apparatus (20) for a selectively addressable and optically readable video disc (22), said playback apparatus including manually activatable control means (24) for the selective activation of one of a number of playback and addressing modes, and also including a first output (26) for the video information read from a disc and organized in frames, characterized in that the system further comprises:
  a. a first input (32) to said playback apparatus for receiving selection signals for the selective activation, in the same way as said manually activated control means, of one of said number of playback and addressing modes;
  b. an extraction element (58) for receiving said video information and for detecting and extracting frame numbers therefrom for presentation to a second output (60);
  c. a computer system comprising:
    c1. interface means (34) for interfacing to said first input and second output;
    c2. a second input (36) which is connected to said second output (60) via said interface means in order to receive said frame numbers;
    c3. an internal random addressable read-write memory for storing the data of alpha-numerical characters, and of selection signals for said playback apparatus to be exclusively activatable by a request signal receivable within said read-write means;
    c4. a third output (38) which is connected to said first input (32) via said interface means (34) in order to output an activated selection signal;
    c5. an internal activation output for supplying control signals and data signals to said internal read/write memory;
    c6. a fourth output (46) for supplying, under the control of a predetermined frame number which acts as data for the computer of said computer system, the data of a predetermined number of said alpha-numerical characters as additional video information in order to display a playback or addressing mode, notably indicating a waiting situation while awaiting a request signal to be received;
    c7. a keyboard (42) for inputting a request signal to said computer to activate, during a waiting situation, a change over to a next playback or addressing mode or waiting situation; and
  d. said keyboard being suitable for inputting computer instructions which are organized according to a higher programming language;
  e. an interface between said playback apparatus and said computer which includes, in addition to said extraction element, emulation switches for a number of said manually activatable control means in order to emulate electrically the activated condition of the associated control means.

2. A system as claimed in claim 1, characterized in that said fourth output is suitable for the connection, independent of said first output, of an additional apparatus for the display of information organized in frames.

3. A device as claimed in claim 1, wherein substantially every emulation switch is provided with electrically separating means (58) between its connections to said playback apparatus and its connections to said computer.

4. A device as claimed in claim 1, wherein said extraction element comprises a serial input connected to a serial clipped video output from said playback apparatus, a control signal input connected to a control output from said playback apparatus for during a vertical blanking interval receiving an enabling signal, a serial storage means for storing a digital frame number contained in said clipped video signal under control of said enabling signal, and a parallel hold means for upon complete storage of a digital frame number in said serial storage means taking over said digital frame number for temporary storage, under control of a further signal emanating from said playback apparatus.

5. A device as claimed in claim 4, wherein said further signal is derived from a predetermined output from said serial storage means.

6. A device as claimed in claim 4 wherein a multiple output of said parallel hold means is byte-multiplexed to an I/0-Bus of said computer.

7. A system as claimed in claim 1, furthermore comprising a second read/write memory for audio information, a sixth output being provided for driving an acoustic generator (76) with said audio information, under selective control by control signals from said said computer system on a fifth control/address output (52).

* * * * *